I. E. GOTT AND J. O. LONGSTREET.
COMBINATION ALARM AND INDICATOR FOR FISHING RODS.
APPLICATION FILED MAR. 5, 1918.
1,330,314.
Patented Feb. 10, 1920.
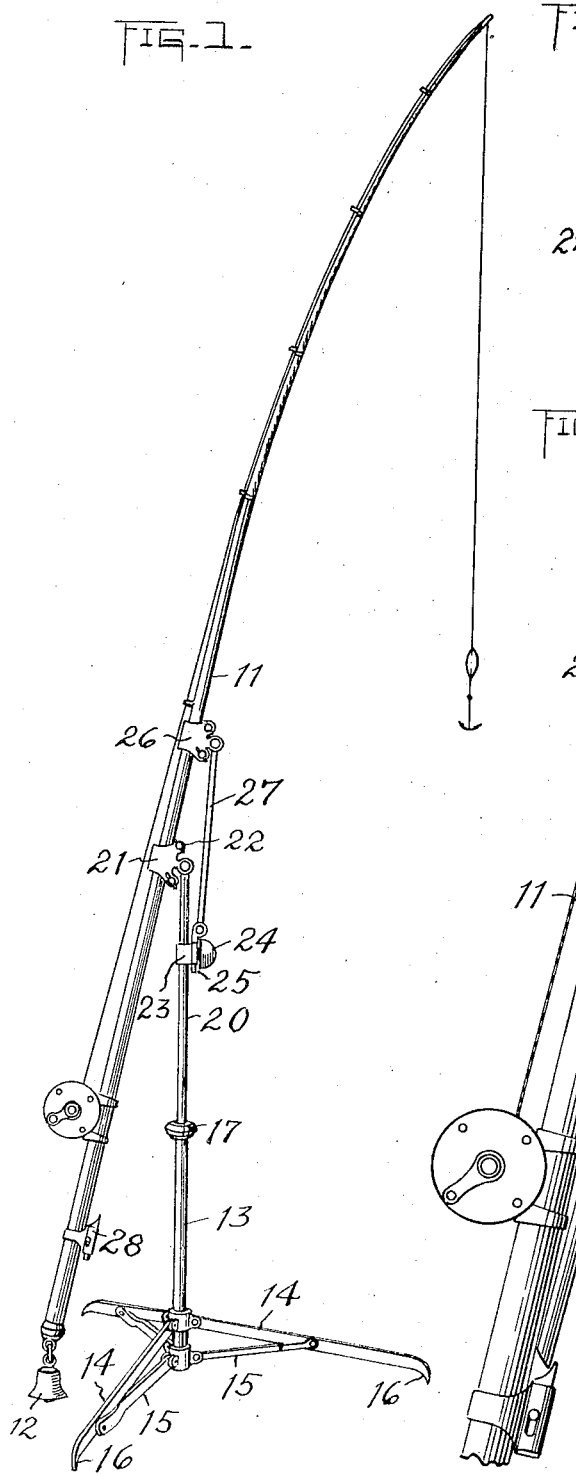
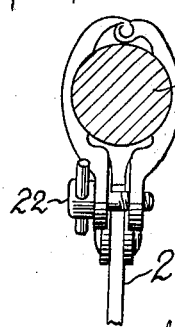
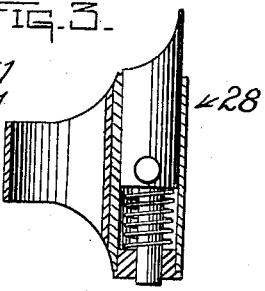
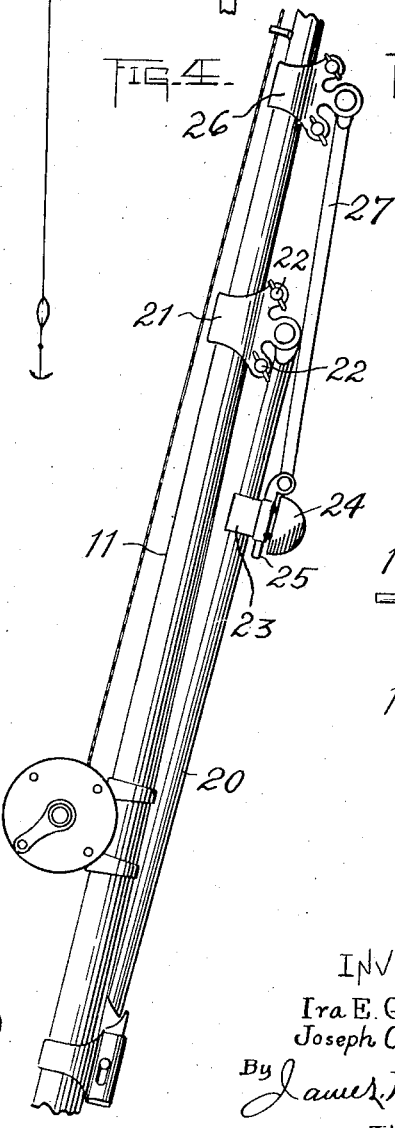
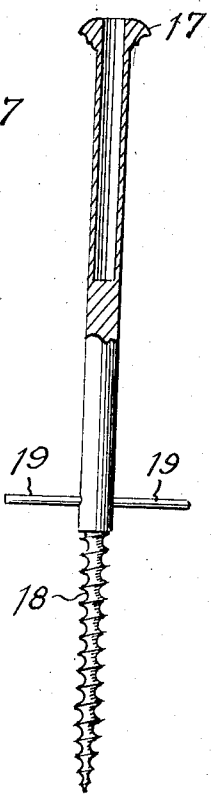
INVENTORS:
Ira E. Gott.
Joseph O. Longstreet.
By James W. Martin
Their Attorney.

UNITED STATES PATENT OFFICE.

IRA E. GOTT AND JOSEPH O. LONGSTREET, OF LOS ANGELES, CALIFORNIA.

COMBINATION ALARM AND INDICATOR FOR FISHING-RODS.

1,330,314.   Specification of Letters Patent.   Patented Feb. 10, 1920.

Application filed March 5, 1918. Serial No. 220,638.

*To all whom it may concern:*

Be it known that we, IRA E. GOTT and JOSEPH O. LONGSTREET, citizens of the United States, and residents of the city and county of Los Angeles and State of California, have invented new and Improved Combination Alarms and Indicators for Fishing-Rods, of which the following is a specification.

This invention relates to a combination of related and coöperative attachments for fishing rods, and the objects of the invention are to provide means for supporting the rod independently in a convenient position for the user, to provide means for indicating visually and audibly to the user that a fish has become engaged with the line and hook, and to otherwise announce that an aquatic animal has become ensnared while the fishing rod is supported by our improved device.

Another object of this invention is to provide a supporting means for the fishing rod, and to provide means for quick detachment of the rod from the support, so that the fisherman may remove and grasp the rod in the usual manner to secure the catch.

Another object is to provide a detachable standard for supporting a fishing rod, which may be firmly secured in operative position by screwing into the soil or into wood planking, such as piers or portions of a boat.

Another object of the present invention is to provide a supporting standard for a fishing rod which may be clamped to any size of rod and in any position, so that the rod will balance in operative position to operate the signals.

Another object of this invention is to provide means for supporting a fishing rod in a position so that it will be free to oscillate with the motion of the waves, and thereby impart a movement to the bait and hook to attract the fish.

The invention consists in certain novel features and principles of the construction, and combinations and arrangements of the several parts whereby important advantages are attained for the convenience of the user, as will be hereinafter fully set forth.

In the drawings Figure 1 is a perspective view of a fishing rod equipped with our signaling and indicating apparatus; the rod being shown in approximately the operative position; Fig. 2 is a sectional view of the rod with one of the clamping members attached thereto; Fig. 3 is a sectional detail of the catch for retaining the supporting rod against the fishing rod; Fig. 4 is an enlarged fragmental view of the rod with the supporting member retained by the catch; and Fig. 5 is a detail view of a modified form of standard.

Referring to the drawings, the fishing rod 11 has attached thereto at the butt, a bell 12, which will provide an audible signal upon violent jerking motion of the fishing rod. The standard 13, is provided with folding legs 14, which when extended, support the standard in the upright position. Braces 15, pivotally connected to the base of the standard, and to legs 14, determine the position of the legs in the operative position. The legs 14, are provided with sharp ends 16, which are adapted to be driven into the ground, or, if used upon a pier or boat, into the wooden portions thereof. The upper end of the standard is provided with a flange 17, the use of which will hereinafter appear.

In the modified form of standard shown in Fig. 5, the bottom end 18, consists of a screw adapted for engagement with the ground, or with a pier or boat, and thereby firmly supports the fishing rod. The handle 19 serve as a means for forcing the screw 18 into the pier or boat.

Either of the standards as shown is made hollow at the upper end to receive the supporting rod 20, which is pivotally connected to the clamp 21, adapted to be secured to the fishing rod. Clamp 21, secured by thumb screws 22, may be adjusted and secured so that the fishing rod will approximately balance upon the standard. A sleeve 23 is slidably mounted on supporting rod 20, and carries a small bell 24, which will ring continuously while the button 25 is depressed by engagement with the flange member 17, upon the standard. A clamp 26 is detachably secured to the fishing rod, and a connecting rod 27 has a pivotal connection with clamp 26 and sleeve 23. The sleeve 23 will have a reciprocating movement upon the rod 20 in accordance with the oscillating movement of the fishing rod. In case a fish be ensnared upon the line and hook, the rod will be suddenly tilted, thereby ringing bell 12, and bell 24 when the limit of movement of the fishing rod is reached.

In use the device is secured in position by engagement of the standard with the ground, or with a pier or boat, after which rod 20 is inserted in the standard, and the fishing rod is secured in clamps 21, 26, so that the butt thereof will approximately counterbalance the line and hook, suspended in the water. After a fish may be ensnared upon the hook, the operator will grasp the rod and remove the same from the standard, and operate in the usual way to land the catch. A catch member 28, affixed to the butt of the fishing rod, will retain the supporting rod 20, as shown in Fig. 4, so as not to interfere with the handling of the fishing rod.

From the foregoing, it is believed that the construction and manner of operation of our improved signaling and indicating device for fishing rods, will be clearly understood. Either of the audible signals is operative independent of the other, but both are dependent upon the actuation of the rod by the fish or game for their operation. The invention consists of comparatively few elements which are simple and efficient for the purpose described, and do not interfere with the manipulation of the fishing rod in the ordinary manner. The attachments are applicable to any fishing rod.

While we have shown and described the present preferred embodiment of the invention, it will be obvious that the same may be variously modified as required by particular circumstances, without departing from the essential features or sacrificing any of the advantages thereof, our invention comprising in combination with a fishing rod, a supporting standard therefor having pivotal connections so that the rod will freely oscillate upon the ensnaring of a fish, and audible signals actuated by the oscillating movement of the fishing rod.

What is claimed is:

1. The combination with a fishing rod, of a standard having pivotal connection with the rod and maintaining the rod in a tiltable position, a sliding member mounted on the standard, a clamp member secured to the fishing rod adjacent to the pivotal connection with the standard, a link pivotally connected to the clamp and to the sliding member, a bell mounted on the sliding member, a push-button adapted to ring the bell when depressed, and a flange on the standard to actuate the push-button when the rod assumes its lowermost tilted position.

2. The combination with a fishing rod, of a standard, a supporting rod, pivotal connections between the supporting rod and the fishing rod, a sliding member mounted on the supporting rod, a signal element carried by the sliding member and actuated by contact with the standard, and a link pivotally connected to the fishing rod and to the sliding member, said supporting rod being carried by the standard in the operative position.

3. In combination, a fishing rod, a supporting standard maintaining the rod in a tiltable position, a sliding member mounted on the supporting standard, a link connecting the sliding member and rod, audible signaling means mounted on the sliding member, and a flange on the standard actuating the signaling means when the rod assumes its lowermost tilted position.

4. In combination, a fishing rod, a collapsible standard, a supporting rod carried by the standard and pivotally connected to the fishing rod, a sliding member movable upon the supporting rod, a signaling bell mounted on the sliding member, a link connecting the sliding member and the fishing rod whereby the sliding member is actuated downwardly as the fishing rod is tilted, and means for actuating the signaling bell carried by the standard and engaging with the bell as the fishing rod approaches its lowermost tilted position.

5. In combination, a fishing rod, a standard, a supporting rod pivotally connected to the fishing rod to support the rod in a counterbalanced position, a sliding member mounted on the supporting rod, a link pivotally connected to the sliding member and to the fishing rod, audible signaling means carried by the sliding member, and actuating means for the signaling means carried by the standard.

6. In combination, a standard, a supporting rod swivelly connected to the standard, a fishing rod pivotally connected to the supporting rod, a sliding member on the supporting rod, a link connecting the fishing rod and sliding member whereby the sliding member moves downwardly when the rod is tilted, a bell mounted on the sliding member, a push-button adapted to ring the bell when depressed, and a circular flange on the standard adapted to actuate the push-button when the rod is tilted to its lowermost position.

In testimony whereof we hereunto affix our signatures, this 17th day of February, in the year 1918.

IRA E. GOTT.
JOSEPH O. LONGSTREET.

In presence of—
FREDERIC M. KEENEY,
ALBERTA MASTER.